(12) United States Patent
Hayashi (10) Patent No.: US 10,606,702 B2
(45) Date of Patent: Mar. 31, 2020

(54) SYSTEM, INFORMATION PROCESSING APPARATUS, AND METHOD FOR REBOOTING A PART CORRESPONDING TO A CAUSE IDENTIFIED

(71) Applicant: Takuya Hayashi, Kanagawa (JP)

(72) Inventor: Takuya Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 141 days.

(21) Appl. No.: 15/813,881

(22) Filed: Nov. 15, 2017

(65) Prior Publication Data

US 2018/0137007 A1    May 17, 2018

(30) Foreign Application Priority Data

Nov. 17, 2016   (JP) .................................. 2016-223704
Nov. 10, 2017   (JP) .................................. 2017-217235

(51) Int. Cl.
*G06F 11/14*    (2006.01)
*G06F 11/07*    (2006.01)

(52) U.S. Cl.
CPC ...... *G06F 11/1441* (2013.01); *G06F 11/0733* (2013.01); *G06F 11/0757* (2013.01); *G06F 11/0793* (2013.01)

(58) Field of Classification Search
CPC ............. G06F 11/0733; G06F 11/0757; G06F 11/0793; G06F 11/1438; G06F 11/1441
See application file for complete search history.

(56) References Cited

U.S. PATENT DOCUMENTS

| 4,618,953 | A | * | 10/1986 | Daniels | G06F 11/0757 714/16 |
| 5,155,729 | A | * | 10/1992 | Rysko | G06F 11/20 714/11 |
| 6,584,587 | B1 | * | 6/2003 | McDermott | G06F 3/14 714/23 |
| 9,495,239 | B1 | * | 11/2016 | Ahmad | G06F 11/0793 |

(Continued)

FOREIGN PATENT DOCUMENTS

| JP | 2007-281728 | 10/2007 |
| JP | 2008-131603 | 6/2008 |

(Continued)

*Primary Examiner* — Gabriel Chu
(74) *Attorney, Agent, or Firm* — Harness, Dickey & Pierce, P.L.C.

(57) ABSTRACT

A reboot system for controlling rebooting of an apparatus includes a first device including first circuitry and a second device including second circuitry and third circuitry. The first circuitry sends a query periodically to the second circuitry, determines whether a communication failure between the first device and the second device occurs according to whether a response is received, and reports the communication failure between the first device and the second device to the third circuitry based on a determination result. The second circuitry sends the response in response to the query sent from the first circuitry. The third circuitry identifies a cause of the communication failure when being reported the communication failure from the first circuitry, and reboots a part of the apparatus corresponding to the cause identified to recover the communication failure between the first device and the second device.

13 Claims, 6 Drawing Sheets

(56) References Cited

U.S. PATENT DOCUMENTS

| | | | | |
|---|---|---|---|---|
| 2002/0152425 A1* | 10/2002 | Chaiken | ............... | G06F 11/0793 |
| | | | | 714/23 |
| 2005/0081115 A1* | 4/2005 | Cheng | ................. | G06F 11/0724 |
| | | | | 714/47.1 |
| 2005/0251704 A1* | 11/2005 | Wagner | ..................... | G06F 1/24 |
| | | | | 714/47.2 |
| 2009/0013221 A1* | 1/2009 | Yanagihara | ............... | G06F 1/24 |
| | | | | 714/55 |
| 2013/0254586 A1* | 9/2013 | Winger | ............... | G06F 11/0793 |
| | | | | 714/3 |
| 2016/0321139 A1 | 11/2016 | Kitamoto et al. | | |
| 2016/0357623 A1* | 12/2016 | Oishi | ................. | G06F 11/0757 |
| 2017/0153898 A1 | 6/2017 | Hayashi | | |

FOREIGN PATENT DOCUMENTS

| | | |
|---|---|---|
| JP | 2015-131415 | 7/2015 |
| JP | 2016-207122 | 12/2016 |

\* cited by examiner

| CAUSE OF COMMUNICATION FAILURE | PROCESS OF DETERMINING WHETHER EVENT RELATED TO CAUSE IS OCCURRING |
|---|---|
| HUNG-UP OF MAIN CPU | THE SUB CPU SENDS QUERY TO THE MAIN CPU, AND DETERMINES A COMMUNICATION FAILURE OCCURS IF NOT RECEIVING RESPONSE MESSAGE FROM THE MAIN CPU. |
| TROUBLE WITH SIGNAL LINE | IN STARTING-UP, THE SUB CPU IS NOTIFIED OF COMMUNICATION WITH THE MAIN CPU FROM THE CONTROL CPU, AND DETERMINES A COMMUNICATION FAILURE OCCURS IF NOT BEING NOTIFIED OF THE COMMUNICATION. |

SYSTEM, INFORMATION PROCESSING APPARATUS, AND METHOD FOR REBOOTING A PART CORRESPONDING TO A CAUSE IDENTIFIED

CROSS-REFERENCE TO RELATED APPLICATION

This patent application is based on and claims priority pursuant to 35 U.S.C. § 119(a) to Japanese Patent Application Nos. 2016-223704, filed on Nov. 17, 2016 and 2017-217235, filed on Nov. 10, 2017, in the Japan Patent Office, the entire disclosures of which are hereby incorporated by reference herein.

BACKGROUND

Technical Field

The present disclosure relates to a reboot system, an information processing apparatus, and a method for rebooting.

Related Art

An image forming apparatus that includes an operation device with a central processing unit (CPU) and a controller board with another CPU and detects an occurrence of a communication failure between the operation device and controller board is known. Such a known image forming apparatus detects a communication failure by detecting disconnection in a constant communication between the two CPUs, and corrects the communication failure detected by automatically rebooting.

Such an image forming apparatus reboots the entire apparatus each time when the communication failure is detected.

SUMMARY

A reboot system for controlling rebooting of an apparatus includes a first device including first circuitry and a second device including second circuitry and third circuitry. The first circuitry sends a query periodically to the second circuitry, determines whether a communication failure between the first device and the second device occurs according to whether a response is received, and reports the communication failure between the first device and the second device to the third circuitry based on a determination result. The second circuitry sends the response in response to the query sent from the first circuitry. The third circuitry identifies a cause of the communication failure when being reported the communication failure from the first circuitry, and reboots a part of the apparatus corresponding to the cause identified to recover the communication failure between the first device and the second device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments of the present disclosure are described below with reference to the attached drawings. Like reference numerals are assigned identical or corresponding components throughout the several views and a description of the identical or corresponding components is omitted here.

First Embodiment

An information processing apparatus 100 according to a first embodiment of the disclosure is described below with reference to FIG. 1 to FIG. 4. The information processing apparatus 100 is an apparatus that processes information, and includes, for example, an image forming apparatus, a personal computer (PC), a mobile phone, a smart phone, and a tablet terminal. The image forming apparatus includes a multi-function peripheral (MFP), a copier, and a facsimile.

The information processing apparatus 100 has a reboot system that reboots at least a part of the apparatus. The reboot system includes an operation device and a controller.

The operation device is a user interface (input/output device) of the information processing apparatus 100. The controller controls overall operation of the information processing apparatus 100. In the following description, an image forming apparatus is used as an example of the information processing apparatus 100 to describe embodiments. Hereinafter, for simplicity, the information processing apparatus 100 is referred to as the image forming apparatus 100.

Figure 1:
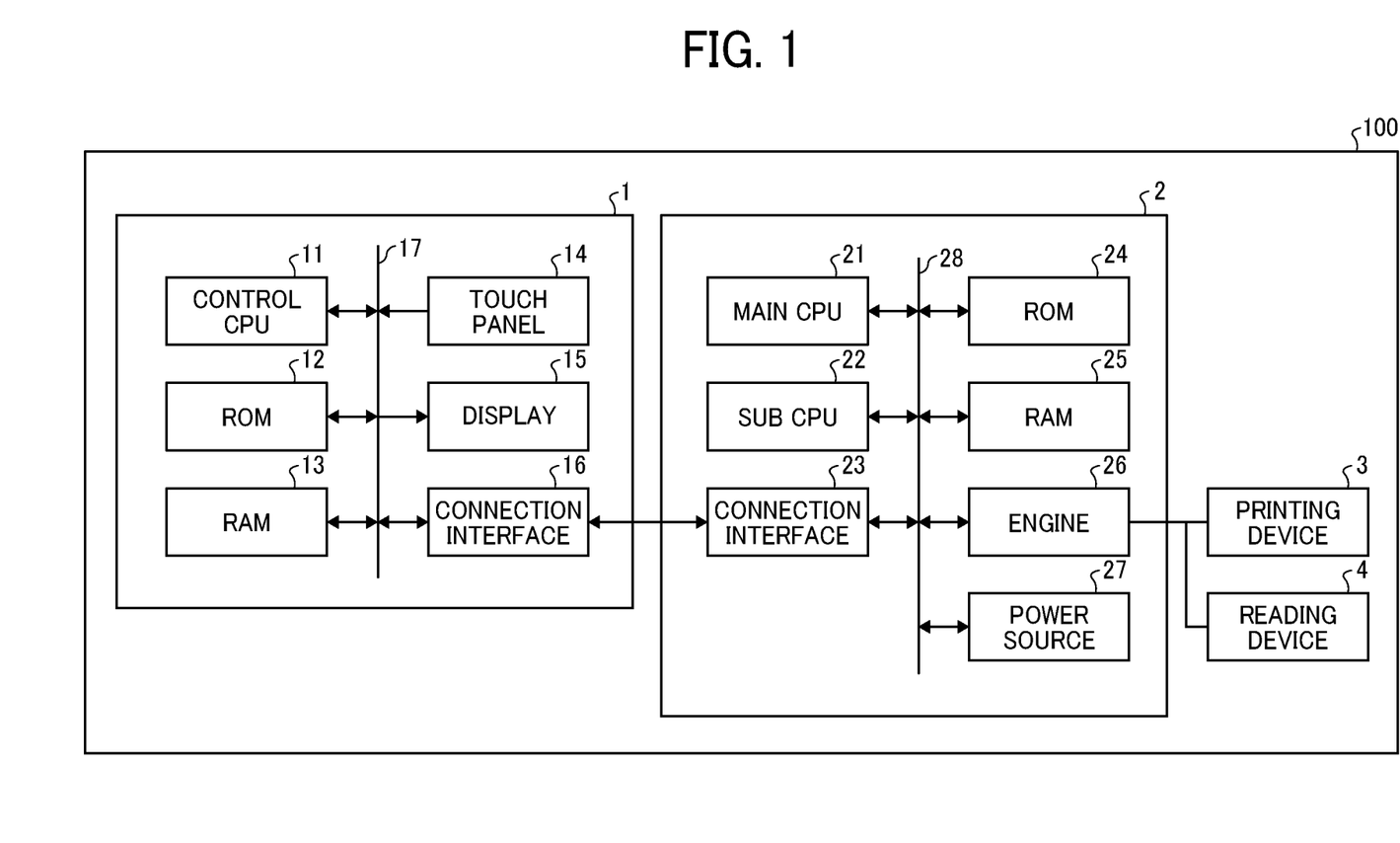
FIG. 1 is a block diagram illustrating a configuration of an image forming apparatus according to one embodiment of the disclosure.

A configuration of the image forming apparatus 100 is described below. FIG. 1 is a block diagram illustrating an example configuration of the image forming apparatus 100, which is an MFP. Referring to FIG. 1, the image forming apparatus 100 includes a control panel 1 (first device) and a controller board 2 (second device). The image forming apparatus 100 also includes a printing device 3 that implements a printing function and a reading device 4 that implements a reading function, in addition to the control panel 1 and the controller board 2.

The control panel 1 is one example of an operation device and configures a reboot system with the controller board 2. The control panel 1 of FIG. 1 includes a control central processing unit (CPU) 11, a read only memory (ROM) 12, a random access memory (RAM) 13, a touch panel 14, a display 15, a connection interface 16, and a bus 17.

The control CPU 11 (first CPU, first circuitry) implements a function of the control panel 1 by executing a program to control each component of the control panel 1. The ROM 12 stores various types of information including the program executed by the control CPU 11. The RAM 13 is used as a working area for the control CPU 11. The touch panel 14 is an input device that receives user operation and inputs information according to the user operation. The image forming apparatus 100 may include other input devices, such as a hardware key, a mouse, and a keyboard, in addition to the touch panel 14. The display 15 displays an operation screen used for operating the image forming apparatus 100 and a message or the like to inform a user. The connection interface 16 is an interface that connects the control panel 1 to the controller board 2 via a network, such as a signal line. The bus 17 connects the control CPU 11, the ROM 12, the RAM 13, the touch panel 14, the display 15, and the connection interface 16 each other.

The operation device in the embodiment is not limited to the control panel 1. The operation device may be any desired device that includes a control CPU, an input device, an output device, and a connection interface.

The controller board 2 is one example of the controller and configures the reboot system with the control panel 1. Referring to FIG. 1, the controller board 2 includes a main CPU 21, a sub CPU 22, a connection interface 23, a ROM 24, a RAM 25, an engine 26, a power source 27, and a bus 28.

Each of the main CPU 21 (second CPU, second circuitry) and the sub CPU 22 (third CPU, third circuitry) executes a program to control each component of the controller board 2 and implement a function of the controller board 2. The main CPU 21 controls overall operation of the image forming apparatus 100. The sub CPU 22 controls the image forming apparatus 100 when a communication failure occurs in the image forming apparatus 100. The connection interface 23 is an interface that connects the controller board 2 to the control panel 1 via a network such as a signal line. Each of the main CPU 21 and the sub CPU 22 is bi-directionally communicable with the control CPU 11 of the control panel 1 using the connection interfaces 16 and 23.

The ROM 24 stores various types of information including the programs executed by the main CPU 21 and the sub CPU 22. The RAM 25 is used as a working area for the main CPU 21 and the sub CPU 22. The engine 26 controls the printing device 3 and the reading device 4 according to instructions from the main CPU 21. The power source 27 controls power supply for each of the control panel 1 and the controller board 2 according to instructions from the main CPU 21 and the sub CPU 22. The bus 28 connects the main CPU 21, the sub CPU 22, the connection interface 23, the ROM 24, the RAM 25, the engine 26, and the power source 27 each other.

The controller in the embodiment is not limited to the controller board 2. The controller may be any desired device that includes a main CPU, a sub CPU, a connection interface, and a power source. Additionally, the power source 27 may be provided separately from the controller.

Figure 2:
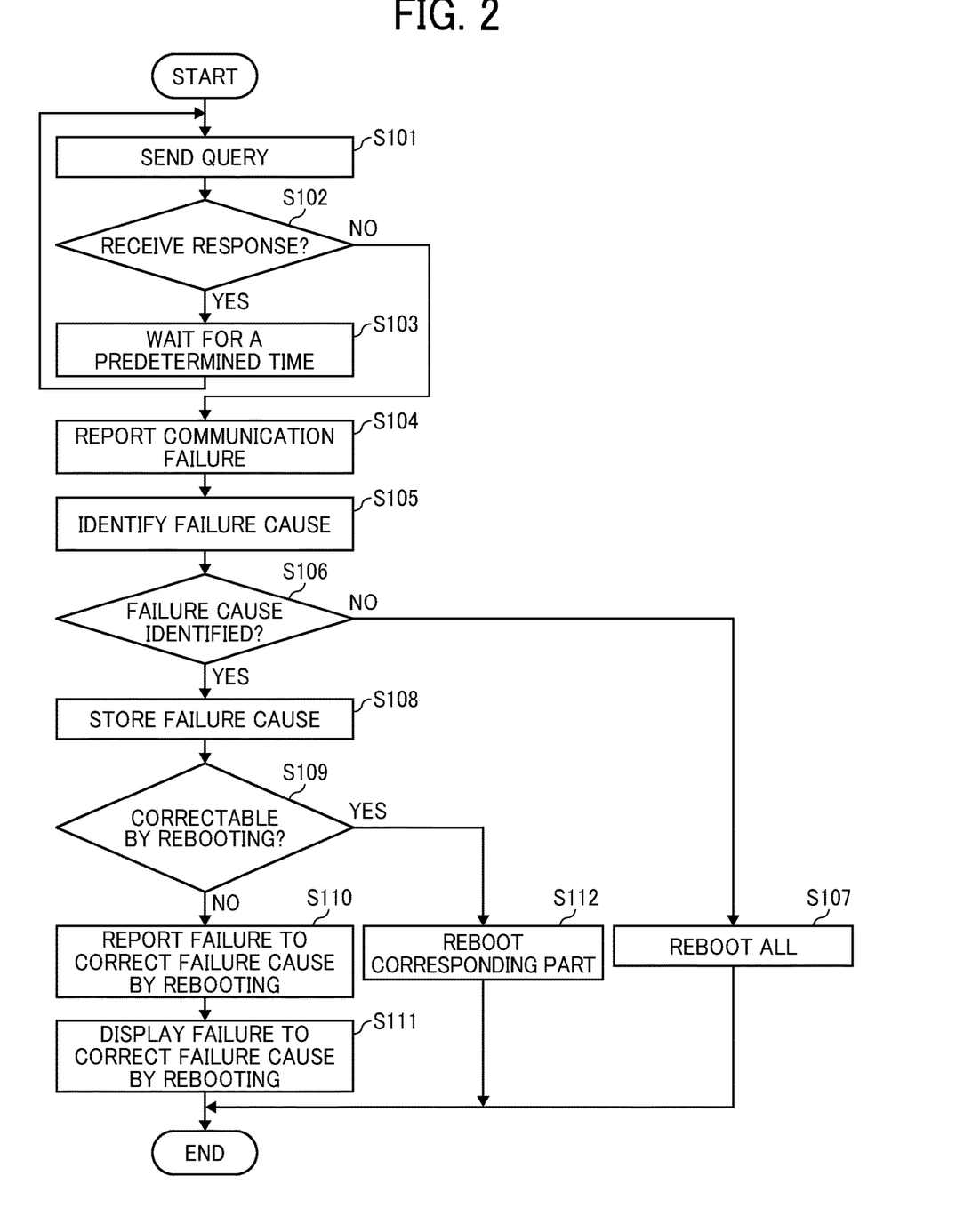
FIG. 2 is a flowchart of an example process performed by the image forming apparatus.

Now, operation of the image forming apparatus 100 according to the embodiment is described below. FIG. 2 is a flowchart illustrating a process performed by the image forming apparatus 100 during the image forming apparatus 100 is operating (after the image forming apparatus 100 starts up).

The control CPU 11 periodically sends a checking message (query) to the main CPU 21 (S101). The query is for checking whether communication between the control panel 1 and the controller board 2 is established appropriately. In response to the query from the control CPU 11, the main CPU 21 sends a response message to the control CPU 11.

When receiving the response message from the main CPU 21 (S102: YES), the control CPU 11 determines that the communication between the control panel 1 and the controller board 2 is established appropriately and waits for a predetermined time, which is desirably set by a designer or a user (S103). Subsequently, the process returns to S101, and repeats S101 to send a query to the main CPU 21 again.

On the other hand, when the control CPU 11 does not receive the response message from the main CPU 21 (S102: NO), the control CPU 11 determines that a communication failure between the control panel 1 and the controller board 2 occurs and reports the communication failure to the sub CPU 22 (S104). That is, the control CPU 11 notifies the sub CPU 22 of the communication failure between the control panel 1 and the controller board 2.

As described above, the control CPU 11 periodically sends a query to the main CPU 21 during operation of the image forming apparatus 100, and periodically receives a response message from the main CPU 21. Through this, the control CPU 11 checks whether the communication between the control panel 1 and the controller board 2 is established appropriately.

When the communication failure is reported from the control CPU 11, the sub CPU 22 identifies a cause of the communication failure (S105). For example, hung-up of the main CPU 21, or a trouble with a signal line between the control CPU 11 and the main CPU 21 (e.g., disconnecting or a loose connection) may be a cause of the communication failure. When the main CPU 21 is hung-up, the main CPU 21 is unable to send a response message in response to a query. Additionally, when such a trouble related to the signal line occurs, a query is failed to be received by the main CPU 21, resulting in no response message received by the control CPU 11.

The sub CPU 22 reads a table used for identifying a cause of the communication failure, which is, hereinafter referred to as a cause-identifying table, from the ROM 24, or the RAM 25 in which the cause-identifying table is expanded. In the cause-identifying table, each cause of the communication failure is associated with a determination process of determining whether an event related to each cause is occurring. The sub CPU 22, then, performs each process to identify the cause of the failure.

Figure 3:
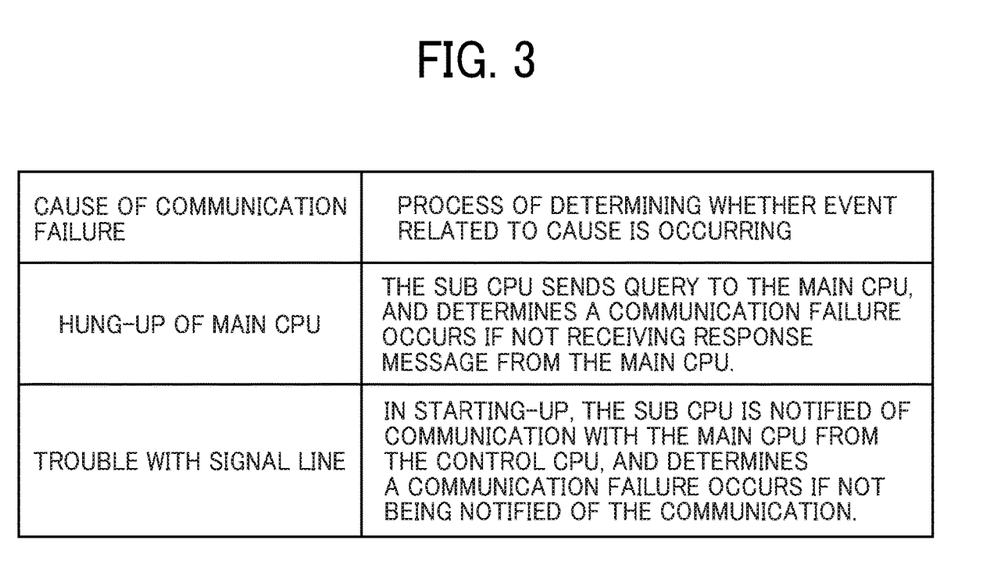
FIG. 3 is a table in which a cause of a communication failure is associated with a determination process of determining whether an event related to the cause is occurring.

FIG. 3 is an example of the cause-identifying table. In the table includes the hung-up of the main CPU 21 and the trouble with the signal line is included as causes of the communication failure. The cause-identifying table of FIG. 3 is one of the examples, but not limited to the embodiment.

Figure 4:
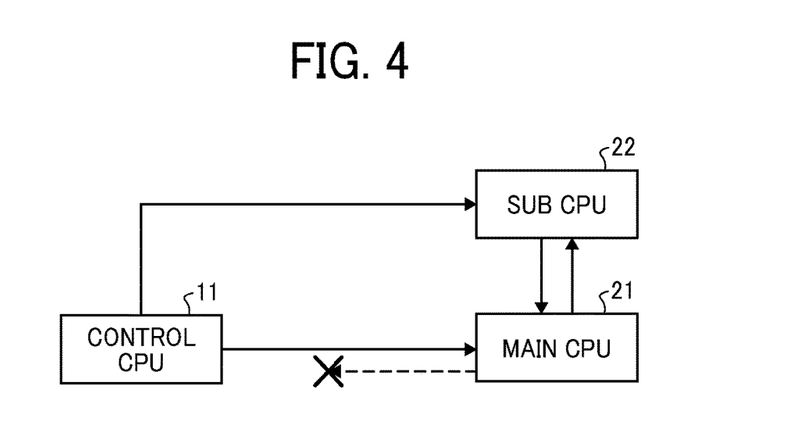
FIG. 4 is a block diagram schematically illustrating an example process for identifying a cause of a communication failure.

FIG. 4 is a block diagram schematically illustrating a process of identifying a cause of the communication failure, performed at S105. More specifically, FIG. 4 illustrates a process of determining whether the main CPU 21 is hung-up. As described above, the control CPU 11 reports the communication failure to the sub CPU 22 when a response message is not received from the main CPU 21 (S104). When being reported the communication failure from the control CPU 11, the sub CPU 22 sends a query to the main CPU 21 and receives a response message in response to the query from the main CPU 21. When receiving the response message from the main CPU 21, the sub CPU 22 determines that the main CPU 21 is not hung-up. On the other hand, when not receiving the response message from the main CPU 21, the sub CPU 22 identify the hung up of the main CPU 21 as a cause of the communication failure. The process illustrated in FIG. 4 corresponds to a process in the first line of the cause-identifying table of FIG. 3.

When failing to identify a cause of the communication failure (S106: NO), the sub CPU 22 reboots all parts of the image forming apparatus 100 including the control panel 1 and the controller board 2 (S107). More specifically, the sub CPU 22 requests the power source 27 to reboot all of the image forming apparatus 100. In response to the request, the power source 27 reboots the entire image forming apparatus 100. When the communication failure occurring is to be corrected by reboot, rebooting the image forming apparatus 100 is effective to clear the communication failure no matter where in the image forming apparatus 100 a cause of the failure is. When the communication failure is corrected by rebooting the entire image forming apparatus 100, the communication between the control panel 1 and controller board 2 is reestablished appropriately.

On the other hand, when identifying a cause of the communication failure (S106: YES), the sub CPU 22 stores information on the cause identified in a non-volatile memory internally provided or the ROM 24, for example, as history information. The history information is useful for repairing and managing the image forming apparatus 100.

Subsequently, the sub CPU 22 determines whether the communication failure caused by the identified cause can be corrected by rebooting (S109). The sub CPU 22 may store each cause so as to be associated with information indicating whether or not to be corrected by rebooting in the table mentioned above.

When the identified cause is not correctable to recover from the communication failure by rebooting (S109: NO), the sub CPU 22 reports to the control CPU 11 that the communication failure is not cleared by rebooting (S110). That is, the sub CPU 22 reports to the control CPU 11 that the communication failure is not to be cleared by rebooting. At this time, the sub CPU 22 may report the identified cause of the communication failure to the control CPU 11. As an example of the cause of the communication failure that is not able to be cleared by rebooting, the trouble with the signal line between the control CPU 11 and the main CPU 21 may be regarded.

The control CPU 11, which is reported that the communication failure is not able to be cleared by rebooting, causes the display 15 of the control panel 1 to display a message to inform a user of occurrence of the communication failure that is not able to be cleared by rebooting and the cause of the communication failure (S111). The control CPU 11 may display a message to inform the user of a service man call error. The service man call error, here, means an error that is not recoverable by the user and requires repair with a maintenance operator (service man). By checking the message, the user is able to know a state of the image forming apparatus 100 and appropriately deal with such a communication failure by, for example, calling a service man.

On the other hand, when the identified cause of the communication failure is able to be corrected by rebooting, (S109: YES), the sub CPU 22 reboots a part corresponding to the identified cause (hereinafter, referred to as a "corresponding part" (S112). More specifically, the sub CPU 22 requests the power source 27 to reboot the corresponding part. According to the request, the power source 27 reboots the corresponding part. At this time, the sub CPU 22 does not reboot the other parts than the corresponding part. Hung-up of the main CPU 21 can be regarded as a cause of the communication failure that is able to be corrected by rebooting.

The corresponding part indicates a part, where the cause is occurring, of all parts each of which is able to reboot independently. For example the following describes a situation where the control panel 1 and the controller board 2 are individually and independently able to reboot. In this situation, when a cause is related to an inside of the control panel 1 (for example, the control CPU 11), the sub CPU 22 reboots the control panel 1 that is a corresponding part, and does not reboot the other parts including the controller board 2. Additionally, when a cause is related to an inside of the controller board 2 (for example, the main CPU 21), the sub CPU 22 reboots the controller board 2 that is a corresponding part, and does not reboot the other parts including the control panel 1. When the communication failure is corrected by rebooting the corresponding part, the communication between the control panel 1 and controller board 2 is reestablished appropriately.

Additionally, when rebooting the corresponding part, the sub CPU 22 may notify the control CPU 11 of rebooting the corresponding part and the cause of the communication failure. The control CPU 11 that receives this notification may cause the display 15 to display a message informing the user of rebooting the corresponding part and the cause of the communication failure. The message allows the user to know a state of the image forming apparatus 100.

As described above, the reboot system according to the embodiment automatically reboots when a communication failure is detected, so that the communication failure is corrected automatically. Additionally, the reboot system according to the embodiment can selectively reboot a corresponding part according to a cause of the communication failure, resulting in reducing power consumption compared to a case of rebooting all of the image forming apparatus 100. Additionally, the reboot system according to the embodiment reduces distrust by not rebooting all of the image forming apparatus 100 each time when the communication failure occurs.

Second Embodiment

The image forming apparatus 100 according to a second embodiment is described below with reference to FIG. 5 to FIG. 9. In the description of the second embodiment, operation of the controller board 2 in starting is described. A configuration of the image forming apparatus 100 according to the second embodiment is substantially the same as that of the first embodiment.

Figure 5:
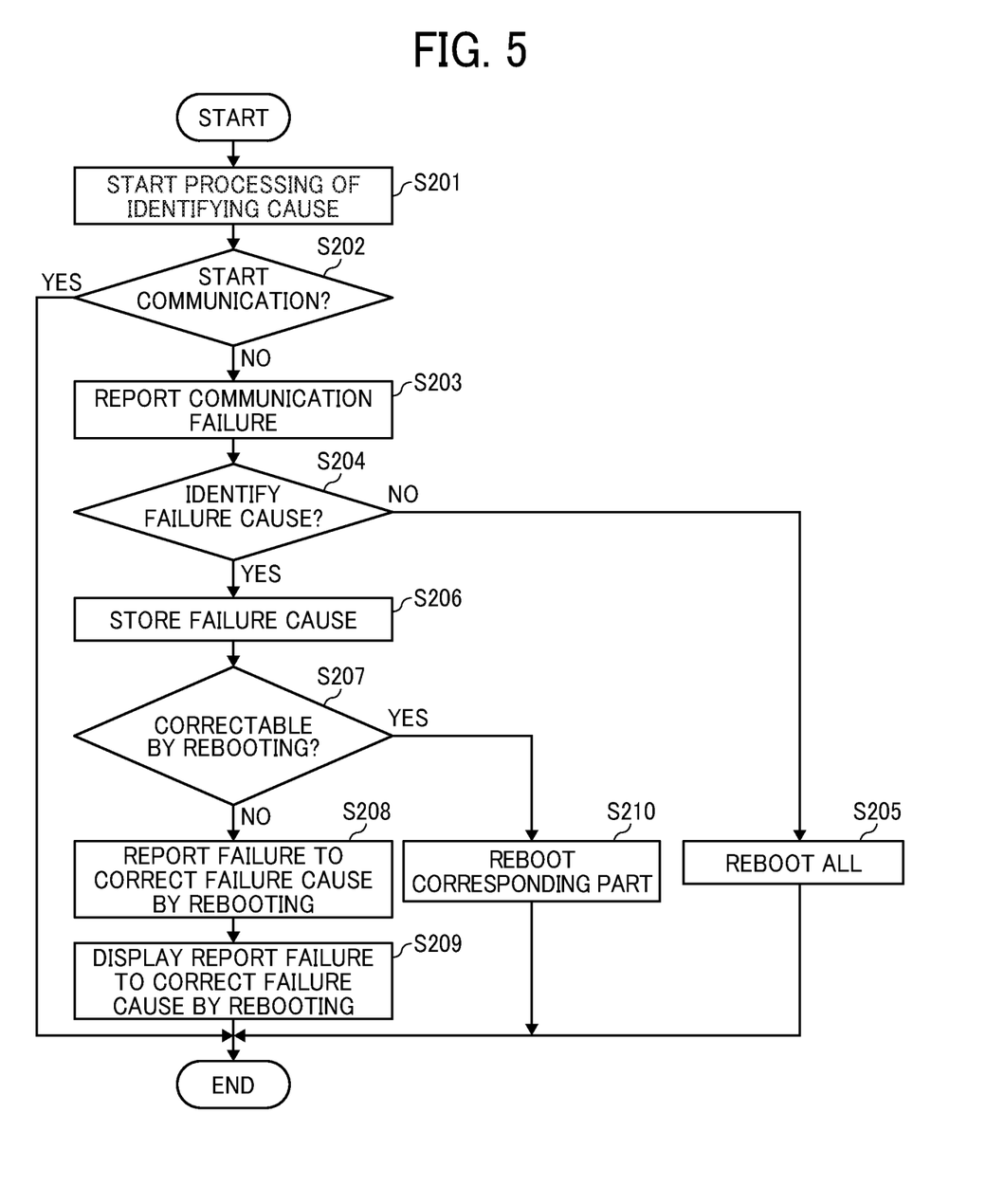
FIG. 5 is a flowchart of a process performed by a controller board when the controller board starts up.

FIG. 5 is a flowchart illustrating operation of the controller board 2 in starting. Processing of S204 to S209 of FIG. 5 is substantially the same as the processing of S106 to S111 of FIG. 2 and the explanation of that is omitted here.

In the embodiment, when the controller board 2 starts up, the sub CPU 22 starts processing of identifying a cause of a communication failure (S201). Whether the communication failure occurs or not is unclear at this time, and when no communication failure occurs, the sub CPU 22 does not identify a cause.

Figure 6:
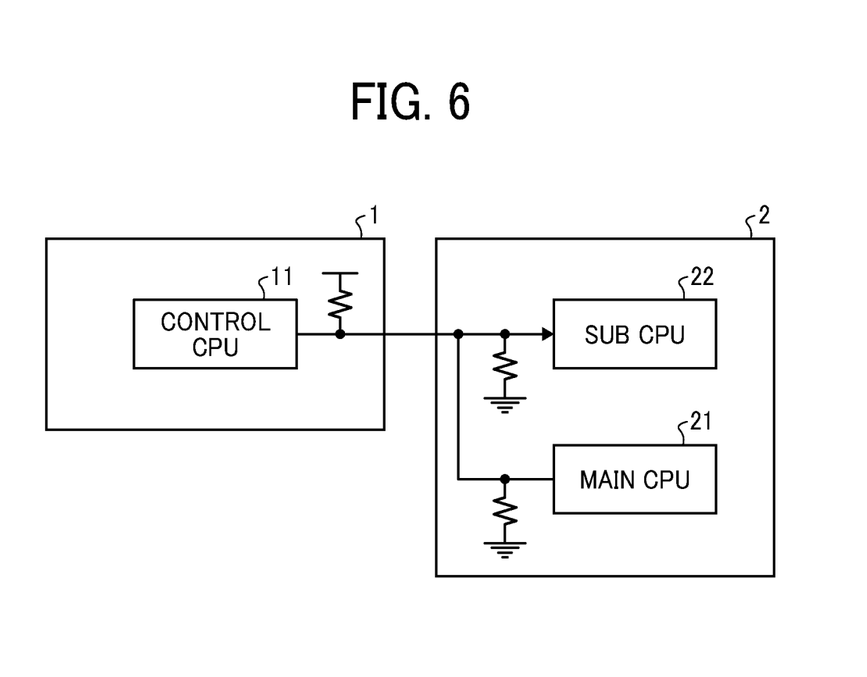
FIG. 6 is a block diagram schematically illustrating another example process for identifying a cause of a communication failure.
Figure 7:
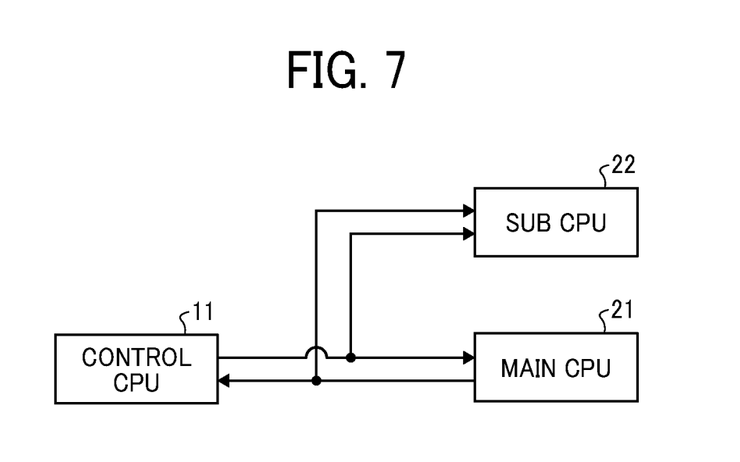
FIG. 7 is a block diagram schematically illustrating still another process for identifying a cause of a communication failure.
Figure 8:
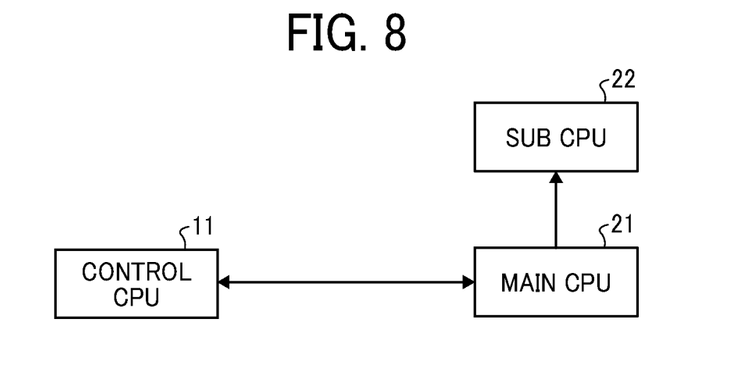
FIG. 8 is a block diagram schematically illustrating still another process for identifying a cause of a communication failure.
Figure 9:
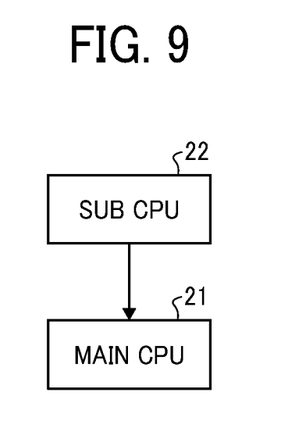
FIG. 9 is a block diagram schematically illustrating still another process for identifying a cause of a communication failure.

FIG. 6 to FIG. 9 are diagrams each schematically illustrating an example process of identifying a cause of the communication failure. More specifically, FIG. 6 to FIG. 8 illustrate a process of determining whether a signal line between the control panel 1 and the controller board 2 is broken. FIG. 9 illustrates a process of determining whether a basic input/output system (BIOS) is broken.

In the example of FIG. 6, a signal line is connected to a pull up resistor in the control panel 1 and connected to a pull down resistor in the controller board 2. When the signal line is normal in FIG. 6, a high (H) level signal is input to the sub CPU 22 when the controller board 2 starts up. The sub CPU 22, accordingly, detects a defect of the signal line by monitoring a level of the signal input when the controller board 2 starts up. In the example of FIG. 6, the sub CPU 22 may determine that the signal line is normal when an H level signal is input and that the signal line is broken when a low (L) level signal is input, when the controller board 2 starts up. When the signal line is determined to be broken, the cause of the communication failure is identified as the trouble of the signal line. Alternatively, the level of signals, the H level and the L level, may be inverted.

In one example illustrated in FIG. 7, the sub CPU 22 detects the trouble of the signal line by monitoring communication established through the signal line between the control CPU 11 and the main CPU 21. In the example of FIG. 7, the sub CPU 22 may determine that the signal line is normal when the communication is established using the signal line, and that the signal line is broken when the communication is not established using the signal line. When the signal line is determined to be broken, the trouble of the signal line is identified as a cause of the communication failure.

Additionally, a period from when the sub CPU 22 starts monitoring the communication to when the sub CPU 22 determines that the signal line is broken is desirably set. Additionally, a method used in FIG. 7 is suitable to a case where the control CPU 11 and the main CPU 21 communicate using a single-end signaling method. With the single-end signaling method, it is easy to check presence of a signal and contents of the signal by monitoring the signal on the signal line.

In another example illustrated in FIG. 8, when the controller board 2 starts up and communication with the control CPU 11 is established, the main CPU 21 sends a notification to inform the sub CPU 22 of the communication is established. The sub CPU 22 can detects an abnormality of the signal line by checking the notification. In the example of FIG. 8, the sub CPU 22 determines that the signal line operates normally when receiving the notification indicating the establishment of the communication from the main CPU 21, and that the signal line is broken when not being reported the establishment of the communication from the main CPU 21. When the signal line is broken, the trouble of the signal line is identified as a cause of the communication failure. The process illustrated in FIG. 8 corresponds to the second line of the cause-identifying table of FIG. 3.

Additionally, a period from when the sub CPU 22 starts receiving the notification form the main CPU 21 to when the sub CPU 22 determines that the signal line is broken is desirably set. Additionally, a method used in FIG. 8 is suitable to a case where the control CPU 11 and the main CPU 21 communicate using the single-end signaling method.

In one example illustrated in FIG. 9, the sub CPU 22 detects a defect of the BIOS by monitoring the BIOS executed by the main CPU 21 when the controller board 2 starts up. In the example of FIG. 9, the sub CPU 22 determines that the BIOS normally operates when the main CPU 21 executes the BIOS and the main CPU 21 normally starts up when the controller board 2 starts up. On the other hand, the sub CPU 22 determines that the BIOS is broken when an error occurs during operation of the BIOS executed by the main CPU 21 and the main CPU 21 does not start up normally. When the BIOS is determined to be broken, the defect of the BIOS is identified as a cause of the communication failure.

Additionally, the main CPU 21, which executes the BIOS, may report to the sub CPU 22 that the BIOS normally operates, after the BIOS normally operates, instead of the sub CPU 22 monitoring the operation of the BIOS executed by the main CPU 21.

According to the embodiment, the sub CPU 22 performs the process described above referring to any one of FIGS. 6 to 8, while the controller board 2 is starting up. After the controller board 2 starts up normally, the process of FIG. 5 being performed during the start-up completes when the control panel 1 and the controller board 2 establish communication (S202: YES). The process of FIG. 2 then starts. In this case, the communication failure does not occur, and thus a cause of the communication failure is not identified in the processing.

On the other hand, when the controller board 2 does not start up normally and the communication between the control panel 1 and the controller board 2 does not starts (S202: NO), the control CPU 11 determines that a communication failure occurs between the control panel 1 and the controller board 2 and reports the communication failure to the sub CPU 22 (S203). That is the control CPU 11 reports that the communication failure occurs between the control panel 1 and the controller board 2 to the sub CPU 22. Subsequently, the process continues to 204 to identify a cause of the communication failure.

As described above, according to the embodiment, the control CPU 11 monitors whether the communication between the control panel 1 and the controller board 2 is established when the controller board 2 starts up, and when the communication is not established, the control CPU 11 determines that the communication failure occurs between the control panel 1 and the controller board 2. The period from when the controller board 2 starts up to when the control CPU 11 determines that a communication failure occurs is desirably set. Additionally, according to the embodiment, the process of identifying a cause of the communication failure is performed by the sub CPU 22 before the control CPU 11 detects the communication failure.

As described above, in the embodiment, the processing of identifying a cause of the communication failure is performed prior to the start up of the controller board 2. This reduces time to be required for the process after detection of the communication failure compared to a case where the process of identifying a cause of the communication failure is performed after the detection of the communication failure. Furthermore, according to the embodiment, the defect of the BIOS that usually is detected only during the start-up of the controller board 2 is able to be identified.

The configurations described above are not limited to those of the exemplary embodiments described above. These are just examples and can be appropriately modified without departing from the spirit of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A reboot system configured to control rebooting of an apparatus, the reboot system comprising:
   a first device including first processing circuitry; and
   a second device including second processing circuitry and third processing circuitry, wherein,
   the first processing circuitry is configured to,
      send a query periodically to the second processing circuitry,
      determine an occurrence of a communication failure between the first device and the second device according to whether a response to the query is received, and
      report the communication failure between the first device and the second device to the third processing circuitry in response to the occurrence of the communication failure,
   the second processing circuitry is configured to send the response to the query to the first processing circuitry, and
   the third processing circuitry is configured to,
      identify a cause of the communication failure,
      reboot a part of the apparatus corresponding to the cause identified to recover the communication failure between the first device and the second device, and
      reboot the first device and the second device when the third processing circuitry fails to identify the cause of the communication failure.

2. The reboot system of claim 1, wherein the third processing circuitry is further configured to reboot the first device as the part of the apparatus to reboot, when the cause occurs in the first device.

3. The reboot system of claim 1, wherein the third processing circuitry is further configured to reboot the second device as the part of the apparatus to reboot, when the cause occurs in the second device.

4. The reboot system of claim 1, wherein the third processing circuitry is further configured to notify the first processing circuitry of rebooting the part corresponding to the cause identified.

5. The reboot system of claim 1, wherein the third processing circuitry is further configured to report to the first processing circuitry that recovery from the communication failure failed, when the communication failure is not corrected after rebooting.

6. The reboot system of claim 1, wherein the third processing circuitry is further configured to store the identified cause in a memory as history information.

7. The reboot system of claim 1, wherein the second processing circuitry is further configured to,
   determine whether an initial communication failure between the first device and the second device occurs in starting the second device, and
   identify a cause of the initial communication failure when the initial communication failure occurs.

8. The reboot system of claim 1, wherein,
   the first device is a control panel of the apparatus, and
   the second device is a controller board of the apparatus.

9. The reboot system of claim 1, wherein the first processing circuitry is further configured to communicate with the second processing circuitry and the third processing circuitry bi-directionally.

10. The reboot system of claim 1, further comprising:
    a memory including a cause-identifying table,
    wherein the third processing circuitry is further configured to identify the cause of the communication failure by referring to the cause-identifying table.

11. The reboot system of claim 10, wherein the cause-identifying table includes a list of a plurality of causes of the communication failure, and each of the plurality of causes of the communication failure is associated with a determination process included in the cause-identifying table.

12. An information processing apparatus, comprising:
    a first device including first processing circuitry; and
    a second device including second processing circuitry and third processing circuitry, wherein,
    the first processing circuitry is configured to,
       send a query periodically to the second processing circuitry,
       determine an occurrence of a communication failure between the first device and the second device according to whether a response to the query is received, and
       report the communication failure between the first device and the second device to the third processing circuitry in response to the occurrence of the communication failure,
    the second processing circuitry is configured to send the response to the query to the first processing circuitry, and
    the third processing circuitry is configured to,
       identify a cause of the communication failure,
       reboot a part of the apparatus corresponding to the cause identified to recover the communication failure between the first device and the second device, and
       reboot the first device and the second device when the third processing circuitry fails to identify the cause of the communication failure.

13. A method for controlling rebooting of an apparatus, the method comprising:

sending a query periodically from first processing circuitry of a first device to second processing circuitry of a second device;
sending a response to the query from the second processing circuitry to the first processing circuitry in response to the query;
determining an occurrence of a communication failure between the first device and the second device according to whether the response is received;
reporting the communication failure between the first device and the second device to a third processing circuitry in response to the occurrence of the communication failure;
identifying a cause of the communication failure in response to the report of the communication failure;
rebooting a part of the apparatus corresponding to the cause identified to recover the communication between the first device and the second device; and
rebooting the first device and the second device when the third processing circuitry fails to identify the cause of the communication failure.

* * * * *